United States Patent [19]

Komatsu

[11] Patent Number: 5,179,642
[45] Date of Patent: Jan. 12, 1993

[54] IMAGE SYNTHESIZING APPARATUS FOR SUPERPOSING A SECOND IMAGE ON A FIRST IMAGE

[75] Inventor: Shigeru Komatsu, Yokohama, Japan

[73] Assignee: Hitachi, Ltd., Tokyo, Japan

[21] Appl. No.: 856,827

[22] Filed: Mar. 25, 1992

Related U.S. Application Data

[63] Continuation of Ser. No. 701,634, May 15, 1991, abandoned, which is a continuation of Ser. No. 282,498, Dec. 12, 1988, abandoned.

[30] Foreign Application Priority Data

Dec. 14, 1987 [JP] Japan .................................. 62-315836

[51] Int. Cl.$^5$ .............................................. G06F 15/00
[52] U.S. Cl. ........................................ 395/135; 358/22
[58] Field of Search ................ 395/135; 340/723, 734; 358/22

[56] References Cited

U.S. PATENT DOCUMENTS

| 4,317,114 | 2/1982 | Walker | 340/734 X |
| 4,352,100 | 9/1982 | O'Connell | 340/723 |
| 4,412,296 | 10/1983 | Taylor | 364/521 |
| 4,635,050 | 1/1987 | Grothe et al. | 340/734 |
| 4,682,297 | 7/1987 | Iwami | 364/521 |
| 4,697,176 | 9/1987 | Kawakami | 340/723 |
| 4,736,200 | 4/1988 | Oununma | 340/734 |
| 4,811,084 | 3/1989 | Belmares-Sarabia et al. | 358/22 |
| 4,827,253 | 5/1989 | Maltz | 340/734 |
| 4,954,883 | 9/1990 | Belmares-Sarabis et al. | 358/22 |

FOREIGN PATENT DOCUMENTS 45567  3/1984  Japan .

Primary Examiner—Gary V. Harkcom
Assistant Examiner—Mark K. Zimmerman
Attorney, Agent, or Firm—Antonelli, Terry, Stout & Kraus

[57] ABSTRACT

An image synthesizing apparatus for synthesizing first and second images with each other which includes a first display memory for storing a first image data constituting a first image, and a display memory control device for comparing a second image data for constituting a second image with a predetermined image data to thereby judge whether the second image data is to be written into the first display memory or not.

8 Claims, 6 Drawing Sheets

IMAGE SYNTHESIZING APPARATUS FOR SUPERPOSING A SECOND IMAGE ON A FIRST IMAGE

This application is a continuation application of Ser. No. 701,634, filed May 15, 1991, now abandoned, which is a continuation application of Ser. No. 282,498, filed Dec. 12, 1988, now abandoned.

BACKGROUND OF THE INVENTION

1. Field of the Invention

The present invention relates to synthesis of digitized images and, more particularly, relates to an image synthesizing apparatus suitable for recording an arbitrary-form foreground image superposed on another background image.

2. Description of the Prior Art

Recently, an image processing system designed to receive, edit and record digitized natural images has been used in work stations and the like. For example, a system of this type is introduced in the reading, "Report on CD-ROM, CD-I Development Field", Nikkei New Media.Technical Forefront Report (1), Nikkei McGraw-Hill Inc., pages 36 to 45, May 1987. The system introduced in the afore-mentioned reading is constituted by a 16-bit micro-processor as a main component, a frame buffer (display memory) of 24-bit depth (8-bit depth in each of R, G and B), a video camera for fetching natural images, an A/D converter, a monitor for confirming the contents of the frame buffer, a tablet or terminal for inputting coordinates and characters, a work memory, and an external storage. The natural images thus fetched can be subject to editing/processing operations, such as removal of noise, change of color tone (saturation and lightness), change of contrast, drawing of outlines, enlargement or reduction of scale, mask synthesis and the like. The term "mask synthesis" used herein means image synthesis which is performed by superposing part of an image on another background image. In this regard, in the aforementioned prior art example, a mask memory is arranged in parallel to the frame buffer (display memory) so that the background image can be combined with the image extracted by masking, with reference to the contents of the mask memory. In general, the reference to the mask memory is carried out by software.

On the other hand, Japanese Patent Unexamined Publication No. 59-45567 discloses a method in which image synthesis is sped up by circuit control on the basis of the judgment from the contents of the mask memory whether data are to be transferred to the corresponding frame buffer or not.

According to the aforementioned prior art, the mask memory must be arranged in parallel to the frame buffer, so that there arises a problem in that the circuit is enlarged in scale. Further, in the case where the reference to the mask memory is carried out by software, a large amount of time is required for image synthesis. On the other hand, in the case where high-speed synthesis is made by circuit control, the mask memory must have a sufficiently short access time compared with the frame buffer. Accordingly, the circuit is apt to be expensive while the circuit scale is apt to be enlarged. Further, in the case where an image to be superposed is fetched on the background preliminarily formed as a fixed uniform color on the assumption of mask synthesis as called "chromakey", an additional procedure comprising the steps of preparing a mask pattern by reference to the aforementioned image and recording it in the mask memory is required. There arises therefore a problem in that a long time is required for image synthesis.

SUMMARY OF THE INVENTION

It is therefore an object of the present invention to solve the problems in the prior art.

It is another object of the present invention to provide an apparatus which is relatively small in scale and inexpensive in cost but which can perform high-speed mask synthesis conveniently.

In order to attain the above objects, according to the present invention, the image synthesizing apparatus for synthesizing first and second images with each other comprises: a first display memory for storing a first image data constituting a first image; and a display memory control means for comparing a second image data for constituting a second image with a predetermined image data to thereby judge whether the second image data is to be written into the first display memory or not.

For example, the above-mentioned unit image data is a pixel data. The display memory control means may be constituted by a first comparison means for comparing the second image data at every unit image data with the predetermined image data, and a write control means for controlling writing of the second image data into the second display memory on the basis of the result of comparison of the first comparison means. The above-mentioned predetermined image data has a specific range so that the first comparison means outputs a coincidence signal when the second image data is included within the range, and the write control means inhibits writing in the second display memory in response to the coincidence signal.

Although the second image data may be stored in a main memory, it may be stored in the second display memory provided separately. In the case where the second display memory is provided, the display memory control means may further include a display reading means for reading image data periodically from the first and second display memories to display the image data, a second comparison means for comparing the second image data read from the second display memory at every unit image data with the predetermined image data, and a selection means for selecting one of the first and second image data read from the first and second display memories on the basis of the result of comparison of the second comparison means. At this time, the second comparison means may also be used as the first comparison means.

Either one or both of the first and second comparison means may be composed of a rewritable memory to which the unit image data is applied as address input and which has the comparison result as data.

The second image data is, for example, an image data having an image to be superposed on the first image as a foreground image and having color excluded from the foreground image as background color, and the predetermined image data is an image data of the background color.

According to the present invention, a second image formed of second image data is combined with a first image formed of image data stored in the first memory, or in other words part of a second image is selectively superposed on a first image. Therefore, the second image data is prepared or fetched so as to serve as background color except for the part of the second image to be superposed on the first image. Therefore, the second image data is compared with an image data representing the background color at every unit image data, for example, every pixel. If these image data coincide with each other, the writing of the second image data is inhibited. If these image data do not coincide with each other, the second image data is written in the first display memory.

By such a configuration, a necessary part of the second image can be selectively superposed on the first image without use of the conventional mask memory. Further, DMA (direct memory access) between memories without use of an MPU (micro processing unit) can be utilized for writing a foreground image alone in the first memory, so that high-speed transfer can be attained.

DESCRIPTION OF THE PREFERRED EMBODIMENTS

First Embodiment

Figure 1:
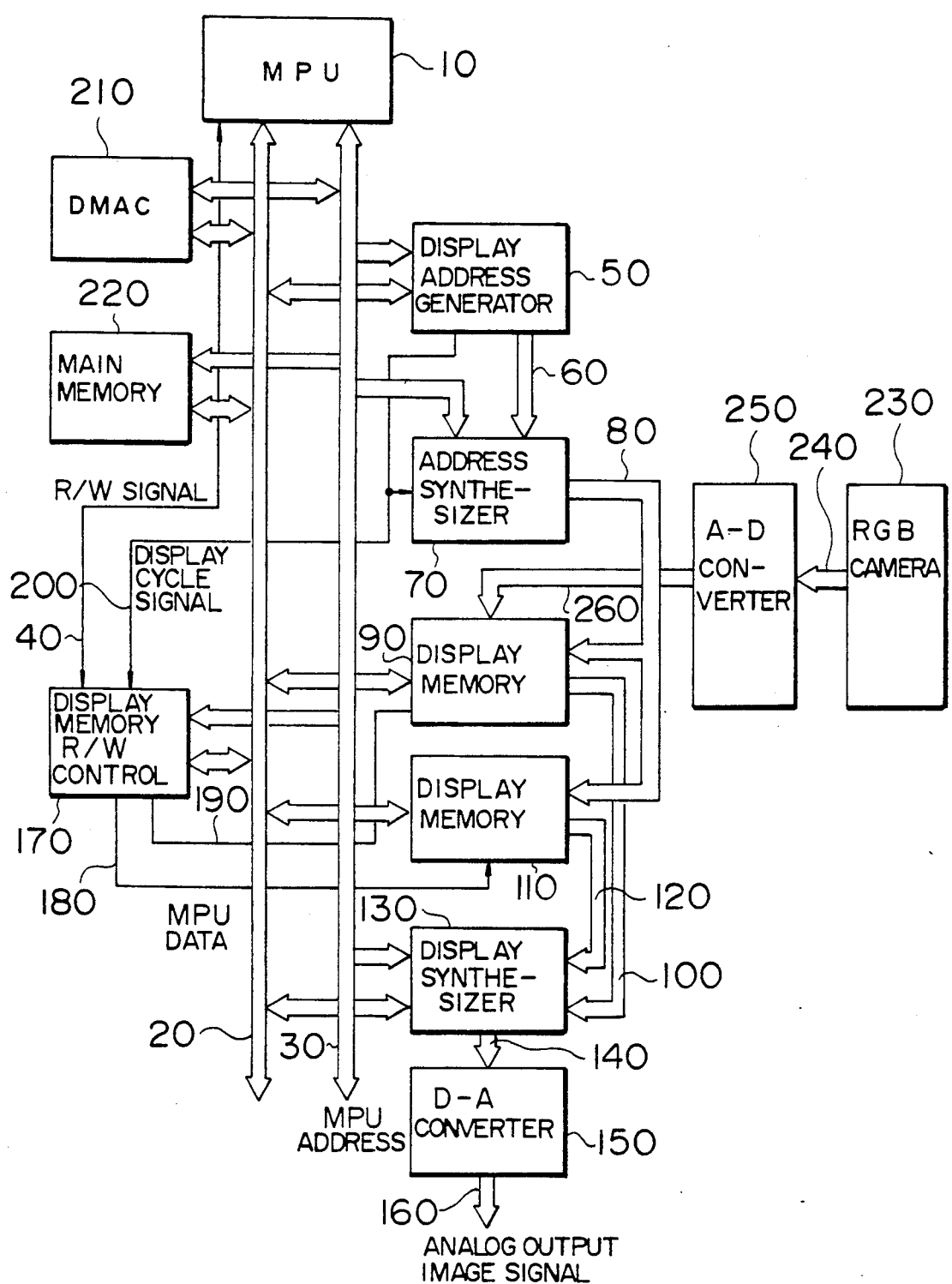
FIG. 1 is a diagram showing an embodiment of the present invention.

A first embodiment of the image synthesizing apparatus according to the present invention will be described with reference to FIG. 1. In FIG. 1, the reference numeral 10 designates an MPU; 20 an MPU data bus; 30 an MPU address bus; 40 an R/W signal; 50 a display address generation portion for generating display and reading addresses and horizontal and sync signals by reference to an original clock; 60 a display address; 70 an address synthesizing portion for combining an MPU address and the display address; 80 a display memory address; 90 a second display memory for storing a second image data; 100 a serial display data as an output read out of the second display memory; 110 a first display memory for storing a first image data; 120 a serial display data as an output read out of the first display memory; 130 a display synthesizing portion for combining the two serial display data 100 and 120; 140 a digital image output; 150 a D-A converter; 160 an analog output image signal; 170 a display memory R/W control portion (display memory control means); 180 an R/W control signal for the display memory 110; 190 an R/W control signal for the display memory 90; 200 a display cycle signal showing a period in which the display address 60 is given to the display memories 90 and 110; 210 a DMAC (direct memory access controller) for controlling the high-speed block transfer of data between memories directly without the MPU 10; 220 a main memory; 230 an RGB camera; 240 an input image signal; 250 an A-D converter; and 260 a digital image input.

The operation of this embodiment is described in accordance with the following. The MPU 10 is a general 16-bit micro-processor. The address generation portion 50 generates signals, such as the display address 60, the display cycle signal 200, and horizontal and vertical sync signals (not shown), by frequency-dividing of a one-pixel period signal as an original clock. The address synthesizing portion 70 changes over the input between the MPU address 30 and the display memory address 60 on the basis of the display cycle signal 200 so as to output the display memory address 80. Accordingly, the address synthesizing portion 70 can give the MPU address 30 to the display memories 90 and 110 to enable a write/read to be carried out in the period other than the period in which the address synthesizing portion 70 gives the display address 60 to the display memories 90 and 110. Each of the display memories 90 and 110 has 5 bits per pixel at every color (15 bits in total of R, G and B), a random access port for access from the MPU 10, and a serial port for putting out data for display. The serial display data 100 and 120 are put out continuously from the serial port to the display synthesizing portion 130. From the display synthesizing portion 130, a selected one of the serial display data 120, the serial display data 100 and a data formed by superposing the foreground image of the serial display data 100 on the serial display data 120 is given as the digital image output 140 to the D-A converter 150 on the basis of the mode predetermined by the MPU 10. From the D-A converter 150, the digital image output 140 of 5 bits at every color of R, G and B is put out as the analog output image signal 160 which is in turn given to a color CRT display unit or the like so that a picture is reproduced on a screen of the CRT.

On the other hand, the input image signal 240 fetched from the RGB camera 230 is converted into the digital image input 260 by the A-D converter 250 and then transferred directly to the display memory 90. The image taken in the display memory 90 may be transferred to the display memory 110, the main memory 220 or the external storage (not shown) for signal processing or storage.

The display memory R/W control portion 170 generates the read/write control signals 180 and 190 for controlling the read/write of the data stored in the display memories 90 and 110, on the basis of the R/W signal 40 from the MPU 10, the MPU address 30, the display cycle signal 200, the transfer mode signal set by the MPU 10 and the value of the data to be transferred. If the transfer mode signal shows a normal mode, the MPU 10 or DMAC 210 is allowed to make access to the display memories 90 and 110 or transfer data to them in accordance with a normal rule. If the transfer mode signal shows a synthesis transfer mode, a data read from the display memory 90 or main memory 220 as the source of transfer is fetched in a register within the display memory R/W control portion 170, as well as a register within the MPU 10 or DMAC 210. It is then judged whether the data has background color in the range predetermined by the MPU 10 or not. If the data has such background color, sending the read/write control signal 180 to the display memory as a destination of transfer is inhibited so that writing cannot be made. The judgement is repeated for all of one scene, so that the foreground image alone can be transferred to the display memory 110 so as to be combined with an image stored in the display memory in advance.

In the following, the arrangement and operation of the display memory R/W control portion 170 are described more in detail with reference to FIGS. 2 and 3.

Figure 2:
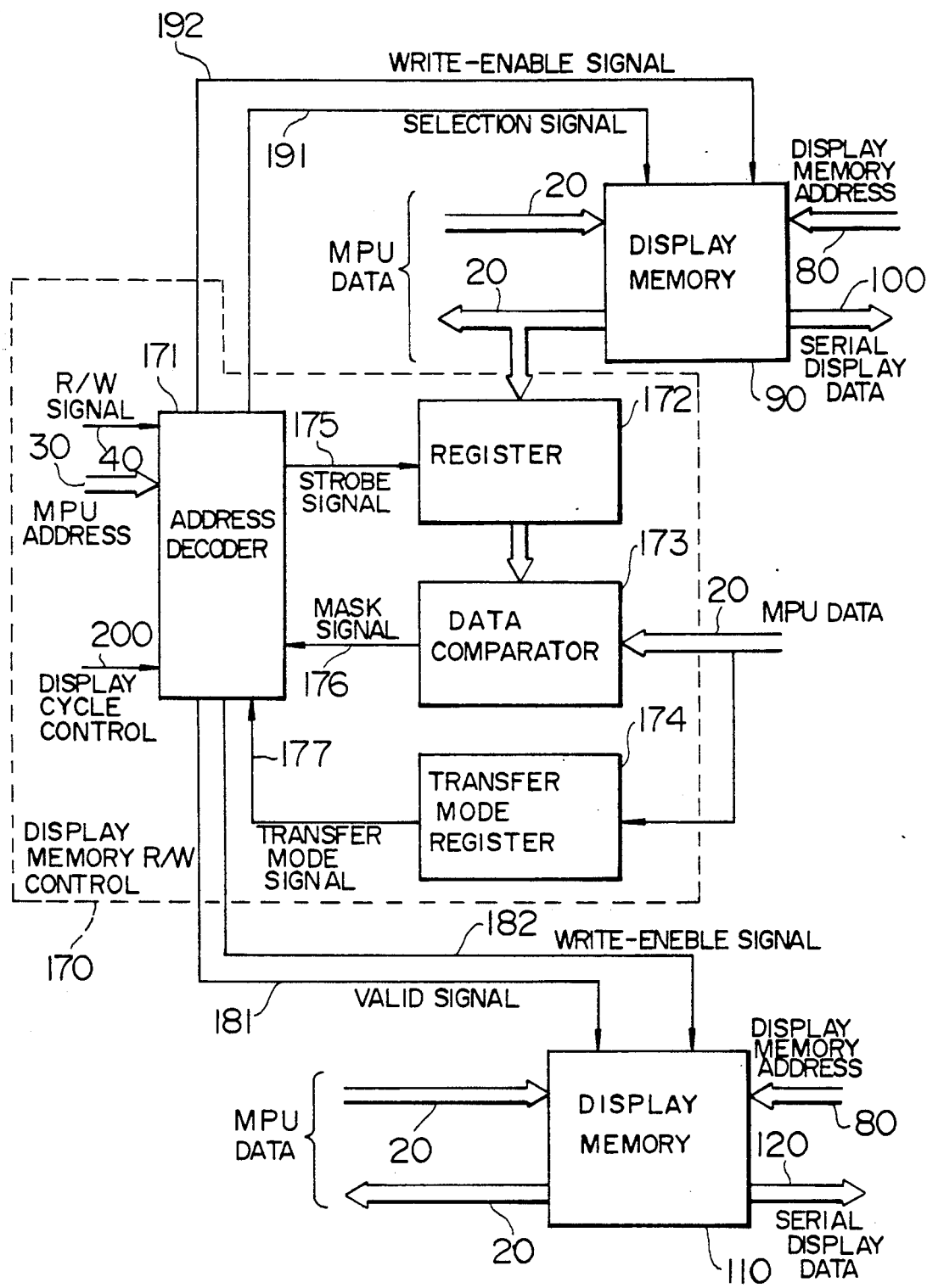
FIG. 2 is a detailed diagram showing a part of FIG. 1.
Figure 3:
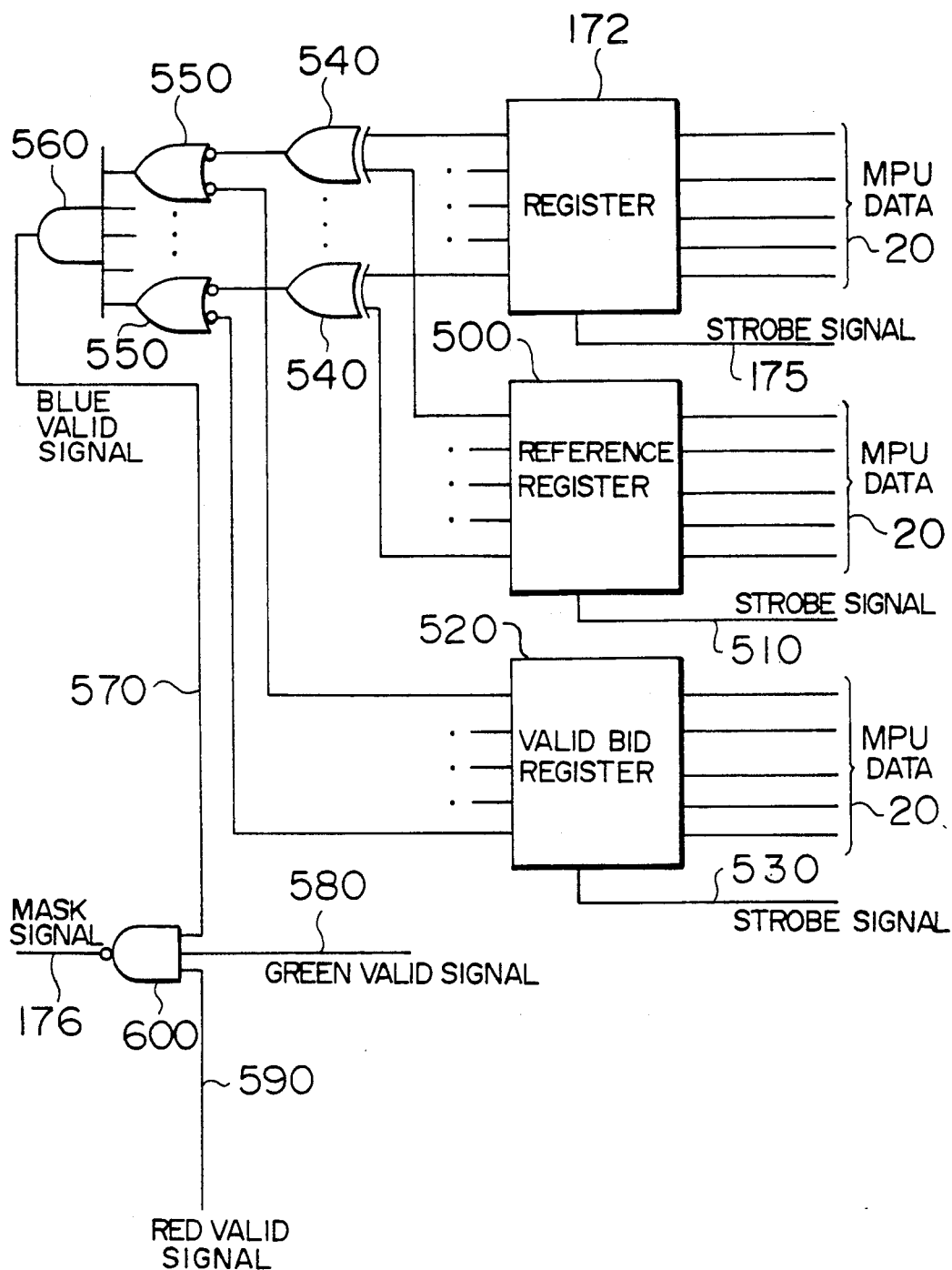
FIG. 3 is a detailed diagram showing another part of FIG. 2.

FIG. 2 is a diagram showing the arrangement of the display memory R/W control portion 170 and its vicinity. FIG. 3 is a circuit diagram showing important parts of the data comparator 173 including a register 172. Like parts in FIGS. 1 to 3 are referenced correspondingly.

In FIG. 2 the reference numeral 171 designates an address decoder; 172 a register for temporarily holding pixel data read from the source of data transfer; 173 a data comparator (first comparison means) for judging whether the output of the register 172 is within the color data range predetermined by the MPU 10 or not; 174 a transfer mode register set by the MPU 10; 175 a strobe signal for fetching color data in the register 172; 176 a mask signal for representing the result of judgment executed by the data comparator 173; 177 a transfer mode signal for indicating whether the mode is a normal mode or a transfer synthesis mode; 181 a valid signal for selecting the display memory 110 to validate the display memory 110; 182 a write-enable signal to be applied to the display memory 110; 191 a selection signal to be applied to the display memory 90; and 192 a write-enable signal to the applied to the display memory 90. In FIG. 3 the reference numeral 500 designates a reference register for holding a reference data to be compared with the blue component fetched in the register 172; 510 a strobe signal generated by the MPU 10 when a data is set in the reference register 500; 520 a valid bit register for indicating bits with which the two registers are compared with each other; 530 a strobe signal generated by the MPU 10 when a data is set in the valid bit register; 540 an EOR gate; 550 an NAND gate; 560 an AND gate; 570 a blue valid signal indicating the fact that the blue component is within a specific range; 580 a green valid signal indicating the fact that the green component is within a specific range; 590 a red valid signal indicating the fact that the red component is within a specific range; and 600 an NAND gate. While not shown in FIG. 3, the comparator 173 is constituted by the reference registers 500, the valid bit registers 520 and the gates 540 to 560 as circuits for generating respectively green valid and red valid signals.

According to the following, the operation is now described. An image to be superposed as a background image is fetched and stored in the display memory 110 in advance. A color data to be used for background color is preliminarily set both in the reference register 500 and in the valid bit register 520 in FIG. 3. When, for example, R, G and B are all "0" or in other words when black is the background color, "0" is written in the all bits of the respective reference registers 500 for blue, green and red through the MPU 10. On the other hand, "1" which represents the fact that all bits are targets of comparison is written in the all bits of the blue, green and red valid bit registers 520. Accordingly, when "0" is fetched in the all blue, green and red registers 172, the blue valid signal 570, the green valid signal 580 and the red valid signal 590 are turned to "H" level, so that the mask signal 176 is turned to "L" level by the action of the NAND gate 600. The valid bit register 520 is arranged to specify background color in a certain range. The operation thereof will be described later.

As described above, after storage of a background image and setting of a background color, the foreground image is stored in the display memory 90 while the color which has been set in the reference register 500 is used as a background color. Specifically, the following two methods are used. One is a method in which a necessary foreground image is fetched through the RGB camera 230 and the A-D converter 250 while the screen of the background color set in advance is used as the background. The other is a method in which a necessary foreground image is drawn on a predetermined background color by use of a graphic composition program as called "paint system" and a coordinate input device (not shown) or the like.

By setting the same color data as that set in the reference register 500 in a transparent register (which will be described later) included in the display synthesizing portion 130 in FIG. 1 and by selecting an overlay mode through the MPU 10 to indicate the image of the display memory superposed on the image of the display memory 110, a virtual image which will be obtained as a result of synthesis of the two images can be confirmed on a screen before the foreground image is transferred to the display memory 110 to combine two images. In the case where the virtual image shows that the foreground image is mismatched with the background color, the background color may be rearranged or the image may be fetched once more. In the case where the virtual image shows that the position of the foreground image is unsuitable, the foreground image may be scrolled in a desired direction, up/down or right/left, to determine the optimum position by giving a suitable offset value to the display address 60 for the display memory 90.

Then the MPU 10 computes the destination address of the display memory 110 on the basis of the offset value obtained as the result of such scrolling, so that the MPU 10 sets the source address of the display memory 90 and the aforementioned destination address in the DMAC 210 and sets the transfer mode register 174 of FIG. 2 to a transfer synthesis mode to transfer the bus control right to the DMAC 210. The DMAC 210 which has received the bus control right transferred from the MPU 10 generates an address of the display memory 90 and a read signal so that the source data is fetched into the internal register. Then the DMAC 210 generates a destination address of the display memory 110 and a write signal, and, at the same time, the DMAC 210 outputs the data which has been fetched previously. The procedure is repeated by for a predetermined number of words while the destination address is always updated. At this time, the background data in the source data is not written in the display memory 110 as a destination so that a foreground image alone is extracted and written in the display memory 110 to attain a synthesized image of the two images.

According to the following, the operation in the transfer synthesis mode is described more in detail. Upon detection of the fact that the source data has been read on the basis of the MPU address 30 and R/W signal 40 given by the DMAC 210, the address decoder 171 generates a strobe signal 175. The register 172 as well as the DMAC 210 fetch the source data on the basis of the strobe signal 175 used as a clock signal. The data comparator 173 compares the data fetched in the register 172 with the background color data preset in the reference register 500 so that the mask signal 176 is made valid if the result of comparison has a specified value. If the mask signal 176 has been made valid when the DMAC outputs the next destination address of the display memory 110, write is inhibited because the valid signal 181 and the write-enable signal 182 for the display memory 110 are gated by the mask signal 176 in the address decoder 171. If the mask signal has not been made valid, on the other hand, the valid signal 181 and the write-enable signal 182 obtained by decoding the MPU address 30 and the R/W signal 40 are given to the display memory 110 in accordance with the normal rule, so that data can be written in the display memory 110 through the MPU data 20. The display cycle signal 200 is a signal for expressing the period in which the periodically given display address is valid. During the period, both the reading and writing of data from the DMAC 210 are not allowed. Accordingly, an acknowledge signal (not shown) from the display memory for the DMAC 210 is prolonged during the period. The selection signal 191 and the rite-enable signal 192 for the display memory 90 are put out regardless of the presence of the mask signal 176.

A truth table related to the main input-output of the address decoder 171 is shown in Table 1. The table is established when the display memory 90 is used as a source of transfer.

TABLE 1

| MPU address 30 (source) | MPU address 30 (destination) | R/W signal 40 | Mask signal 176 | Strobe signal 175 | Effective signal 181 | Selection signal 191 |
|---|---|---|---|---|---|---|
| T | F | R | X | T | F | T |
| T | F | W | X | F | F | T |
| F | T | R | X | F | T | F |
| F | T | W | F | F | F | F |
| F | T | W | F | F | T | F |
| F | F | X | X | F | F | F |

T = true, F = false, X = no relation.

As described above, a mask-synthesized image can be formed from two images by the aforementioned method if the background color takes one specified value. However, the value of the background color varies over a certain range according to the factors such as lighting condition, camera noise and the like, even in the case where a foreground image on a screen having a uniform background color is fetched by the RGB camera 230. In the following, a method of establishing background color to vary within such a certain range is described with reference to FIG. 3.

When, for example, a foreground image is fetched with blue for a background, background color is established so that the mask signal 176 is made valid in the condition in which the level of blue is not lower than a predetermined value and, at the same time, the levels of red and green are not higher than the predetermined value. The case where the level of blue is detected to be not lower than the level 24 in the level 32 is now considered. Assuming now that a binary numeral having two higher-rank bits of "1" is written in the blue reference register 500 and that a binary numeral (11000) is written in the valid bit register 520, then the blue valid signal 570 is made valid when the level of blue is within a range of from a binary numeral (11000) to a binary numeral (11111) regardless of the values of the three lower-rank bits. In other words, the blue valid signal 570 is made valid when the level of blue reaches a decimal numeral not smaller than 24. In the following, this operation is described more in detail. The corresponding bits of the register 172 and the reference register 500 are compared with each other by the EOR gate 540. If the corresponding bits coincide with each other, the output of the EOR gate 540 becomes "L". The output is given to one input terminal of the NAND gate 550 with its other input terminal arranged to receive the output of the corresponding bit of the valid bit register 520. If the output of the corresponding bit of the valid bit register 520 is "L", the output of the NAND gate 550 is always kept "H" regardless of the output of the EOR gate 540, so that the result of bit comparison is neglected. If the output of the corresponding bit of the valid bit register 520 is "H", on the contrary, a value reverse to the output of the EOR gate 540 is given to the NAND gate 560. When all of the values are of an "H" level or in other words, when all valid bits of the register 172 and the reference register 500 coincide with each other, the level of the blue valid signal becomes "H". The same procedure can be applied to the cases of the green valid signal 580 and the red valid signal 590. For example, to establish these valid signals to be in "H" level when the levels of green and red are not larger than 3, the value of "0" is written in each of the three upper-rank bits of the green and red reference registers 500 and then a binary numeral (11100) is written in the valid bit registers 520. In this condition, the green valid signal 580 and the red valid signal 590 are made valid when the levels of green and red are within a range of from a binary numeral (00000) to a binary numeral (00011) regardless of the values of the two lower-rank bits. In other words, the green valid signal 580 and the red valid signal 590 are made valid when the levels of green and red are not larger than a decimal numeral 3. If the blue valid signal 570 is also made valid, the mask signal 176 is made valid by the action of the NAND gate 600.

Figure 4:
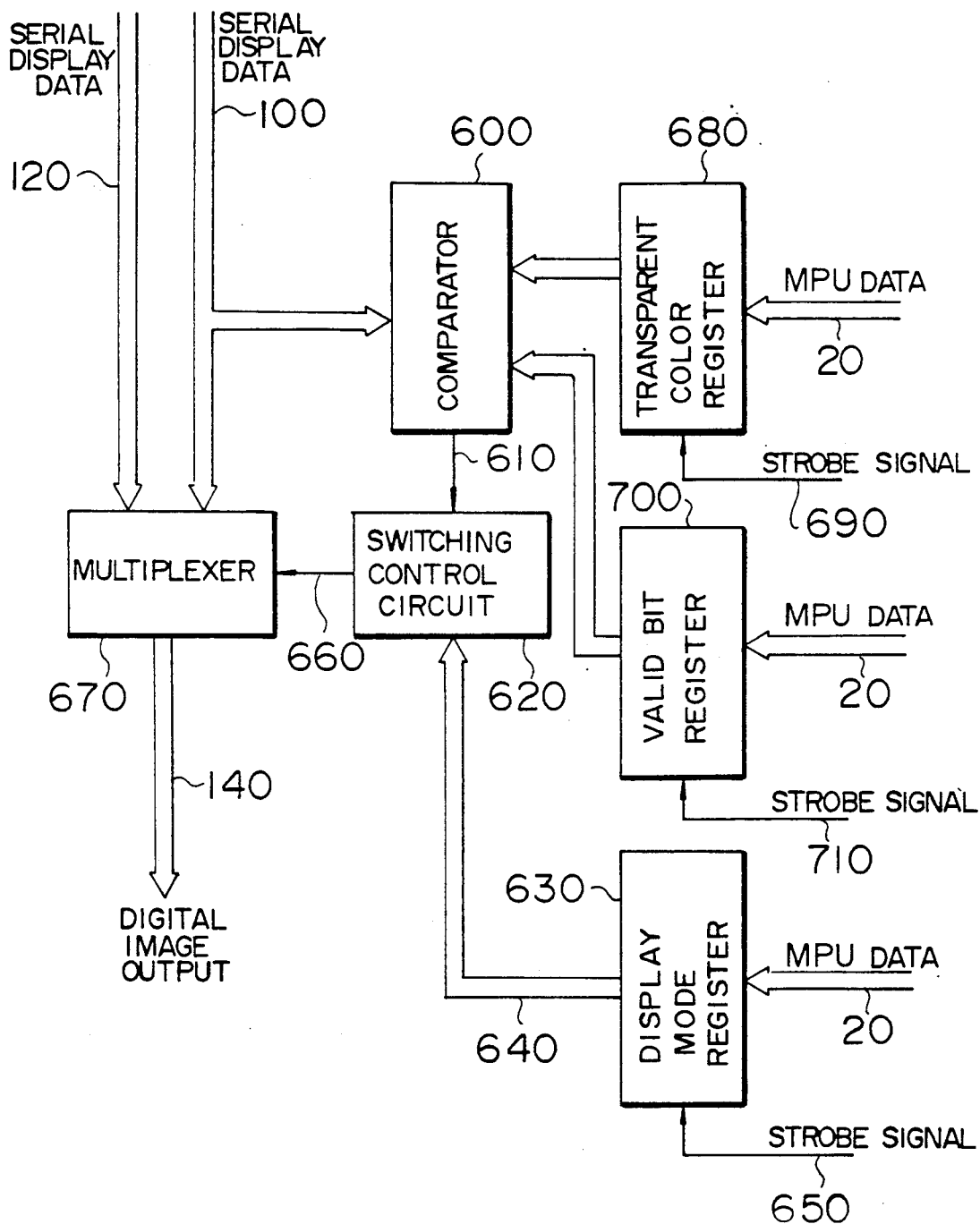
FIG. 4 is a detailed diagram showing still another part of FIG. 1.

In the following, the arrangement and operation of the display synthesizing portion 130 are described in detail with reference to FIG. 4. In FIG. 4, the reference numeral 600 designates a comparator (second comparison means); 610 a coincidence signal; 620 a switching control circuit; 630 a display mode register; 640 a display mode signal; 650 a strobe signal; 660 a switching signal; 670 a multiplexer; 680 a transparent color register; 690 a strobe signal; 700 a valid bit register; and 710 a strobe signal. In the following the operation is described. A color data of transparent color is set in the transparent color register 680 through the MPU 10. Also a data is recorded in the valid bit register 700 so that the valid bits thereof corresponding to the transparent color register 680 have the value of "1" and the other bits thereof have the value of "0". The comparator 600 compares the serial display data 100 and the contents of the transparent color register 680 with each other at every pixel. When those data coincide with each other, the comparator 600 validates the coincidence signal 610. The comparison may be carried out within a certain range based on the value of the valid bit register 700. The operation of the comparator 600 is the same as the operation of the data comparator 173 which has been described.

The switching control circuit 620 generates a switching signal 660 on the basis of the coincidence signal 610 and the display mode signal 640 preliminarily set in the display mode register 630 through the MPU 10. The display mode signal 640 is composed of two bits. When the display mode signal 640 is (00), the switching signal 660 is always "0" so that the serial display data 120 is selected by the switching circuit 670 and fed to the D-A converter 150 as the digital image output 140. When the display mode signal 640 is (01), the switching signal 660 is always "1" so that the serial display data 100 is selected. When the display mode signal 640 is (10) or (11), the coincidence signal 610 itself is fed to the switching circuit 670. In this display mode, the digital image output 140 can serve as a signal for forming an image synthesized by superposing the serial display data 100 as a foreground on the serial display data 120 as a background, through setting the set values of the reference register 500 and the valid bit register 520 respectively in the transparent color register 680 and the valid bit register 700. This is a overlay mode as described above. The transparent color register 680 and the valid bit register 700 in FIG. 4 have the same construction and function as those of the reference register 500 and the valid bit register 520 shown in FIG. 3. Accordingly, the former may be provided to serve as the latter.

According to this embodiment, high speed mask synthesis can be made by use of the DMAC without provision of any mask memory. Further, a virtual synthesized image can be checked or modified on a screen before data are transferred actually. Accordingly, the image synthesizer has advantages in that failure is reduced and in that handling thereof is simple. If checking the virtual synthesized image in advance is not required, it is a matter of course that the source memory is not limited to the display memory and that the main memory may be used as the source memory to make it possible to omit a series of display memories to thereby reduce the circuit scale.

On the other hand, and in the case where two series of display memories are provided, the transparent color register 680 can be provided to serve as the reference register 500 and the valid bit register 700 can be provided to serve as the valid bit register 520. Accordingly, not only the circuit scale can be reduced but handling can be improved with the reduction in number of registers to be set.

Second Embodiment

A second embodiment of the present invention will be described with reference to FIG. 5. The construction of the second embodiment is substantially the same as the construction of the first embodiment shown in FIG. 1, except the arrangement and operation of the display R/W control portion 170. Like parts in FIGS. 1, 2 and 5 are referenced correspondingly.

Figure 5:
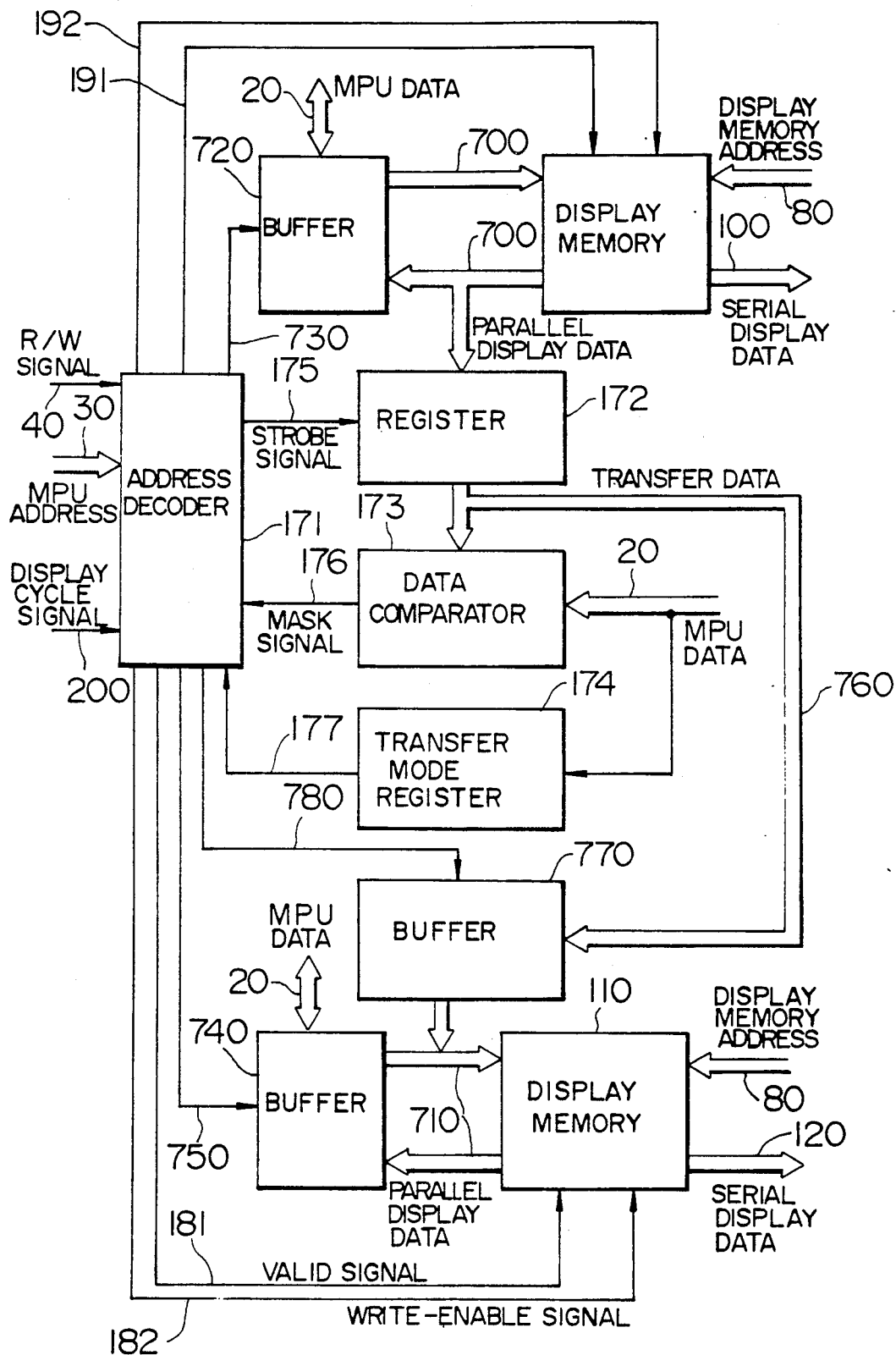
FIG. 5 is a diagram showing a second embodiment of the present invention.

In the following, new parts in FIG. 5 are described. In FIG. 5, the reference numeral 700 designates a parallel display data of the display memory 90; 710 a parallel display data of the display memory 110; 720 a buffer for controlling the connection between the parallel display data 700 and the MPU data 20; 730 a control signal for the buffer 720; 740 a buffer between the parallel display data 710 and the MPU data 20; 750 a control signal for the buffer 740; 760 a transfer data; 770 a buffer for feeding the transfer data 760 to the display memory 110; and 780 a control signal for the buffer 770.

In the following, the operation of this embodiment will be described as to the different points from the first embodiment. In this embodiment, the display memories 90 and 110 have 8 bits per pixel at every color (24 bits in total of R, G and B). On the other hand, the MPU data 20 still has a 16 bit bus width. Therefore, reading/writing of all one-pixel data cannot be perfected in one access from the MPU 10 or DMAC 210. In the normal mode, as specified by the transfer mode register 174, two addresses are assigned for one-pixel data so that reading/writing of all one-pixel data can be perfected in two accesses. The parallel display data 700 and 710 have a width of 24 bits in which the upper rank 16 bits are connected to the MPU data 20 in access for the even-number address and the lower rank 8 bits are connected to the MPU data 20 in access for the odd-number address by the buffer 720. Therefore, the one-pixel data is separately stored in two continuous addresses so that the buffers 720 and 740 can be controlled through the control signals 730 and 750 on the basis of the judgment as to whether the least significant bit of the MPU address 30 is "1" or "0".

When the display memory 90 as a source of transfer is read by the DMAC 210 or MPU 10 in the synthesis transfer mode selected by the transfer mode register 174, on the other hand, all of the 24 bits of a one-pixel data are sent out as a parallel display data 700. At this time, the strobe signal 175 is made valid so that all of the 24 bits are fetched in the register 172. The data comparator 173 generates a mask signal 176 on the basis of the judgment as to whether the 24-bit data shows background color or not. At the same time, the 24-bit data is fed to the buffer 770 as the transfer data 760. If the transfer data 760 does not show background color, the mask signal 176 is left in the invalid state so that the address decoder 171 separates the parallel display data 710 from the MPU data 20 through the control signal 750 by use of the buffer 740 when the address of the display memory 110 as a destination is selected. At the same time, the transfer data 760 is fed to the display memory 110 as the parallel display data 710 through the control signal 780 by the buffer 770. At this time, the valid signal 181 and the write-enable signal 182 are simultaneously made valid by the two continuous addresses so that the 24-bit data can be written. In the case where the transfer data 770 is a background color data, the mask signal 176 is made valid in the same manner as in the first embodiment and the valid signal 181 and the write-enable signal 182 are inhibited, so that the data is not written in the display memory 110 or in other words the data is not transferred. The aforementioned procedure is repeated to update the source and destination addresses by two addresses so that mask synthesis is perfected.

According to this embodiment, as in the case where a one-pixel data overflows the bus width of the MPU data, it is possible to judge or control whether the data is to be transferred or not. In addition, the transfer rate is high as in the case where the one-pixel data is not more than the bus width of the MPU data.

Third Embodiment

Figure 6:
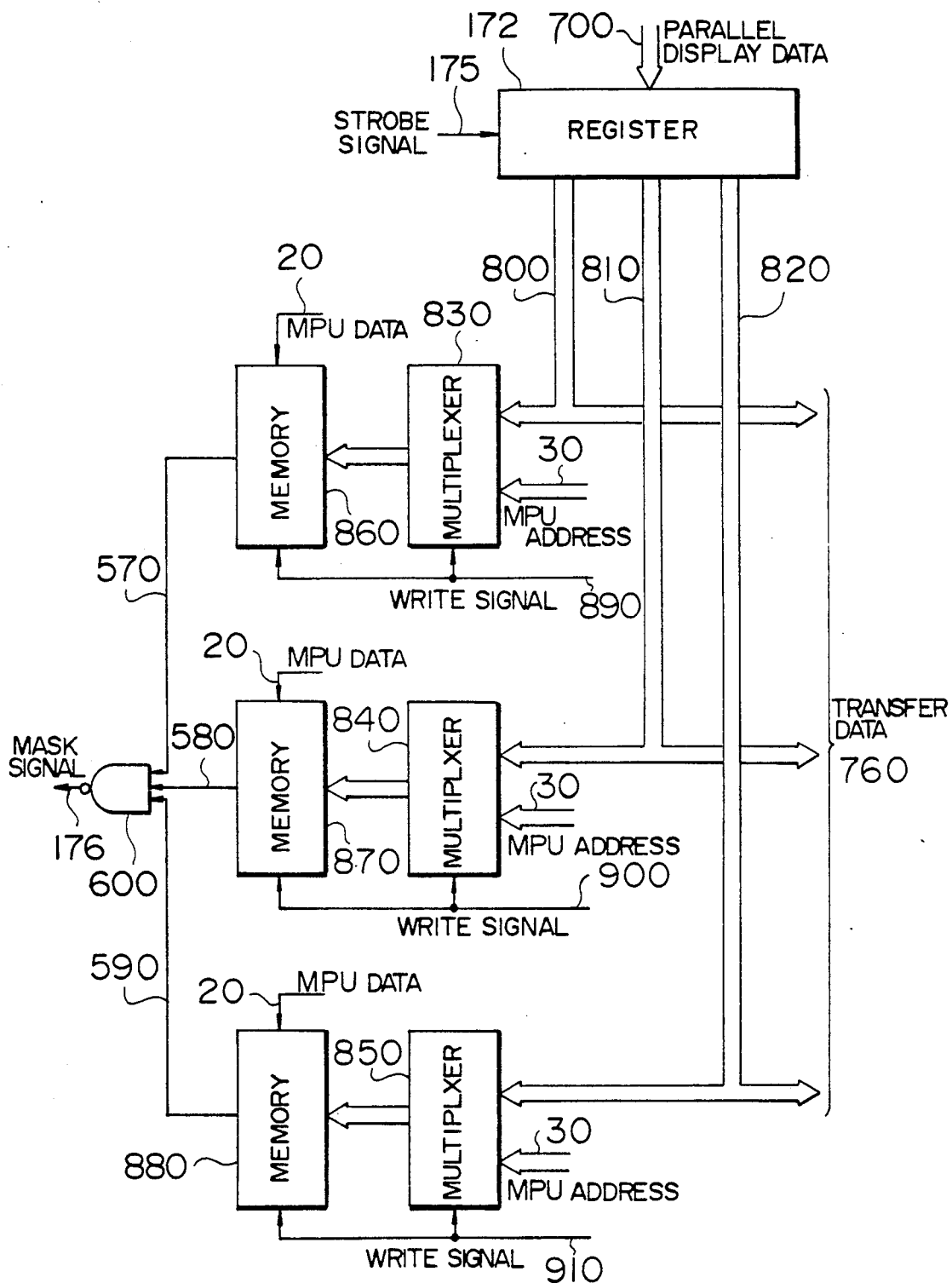
FIG. 6 is a diagram showing a third embodiment of the present invention.

A third embodiment of the present invention will be described with reference to FIG. 6. The construction of the third embodiment is substantially the same as the construction of the first embodiment shown in FIG. 1, except the arrangement of the data comparator 173 in the display memory R/W control portion 170. FIG. 6 shows the arrangement of the data comparator according to this embodiment.

In FIG. 6, the reference numeral 800 designates a blue transfer data; 810 a green transfer data; 820 a red transfer data; 830, 840 and 850 address multiplexers respectively; 860, 870 and 880 rewritable memories each with the data width of 1 bit and the address length of 8 bits or more; 890, 900 and 910 write signals each generated when a data is written by the MPU 10.

In the following, the operation of this embodiment is described. A one-pixel 24-bit parallel display data 700 read from the display memory 90 as a source of transfer is fetched in the register 172. The data is separated into three 8-bit transfer data 800, 810 and 820 representing R, G and B components to be fed to the multiplexer 830, 840 and 850, respectively. In the multiplexers 830, 840 and 850, in general, the transfer data 800, 810 and 820 themselves are fed to the address terminals of the memories 860, 870 and 880, respectively. The memories 860, 870 and 880 are provided to generate the valid signals 570, 580 and 590 for each color so that the signals take "1" if the transfer data 800, 810 and 820 are within a specified range and the signals take "0" if the transfer data are out of the range. In the NAND gate 600, the mask signal 176 is made valid if the three input signals are all "1". The memories 860, 870 and 880 are rewritable memories having at least one-bit-width 256 addresses, so that one-bit data can be written directly from the MPU 10. If the MPU 10 generates the addresses of the three memories for data writing, the write signals 890, 900 and 910 are made valid so that the multiplexers 830, 840 and 850 which are receiving the write signals as switching control signals feed the MPU address 30 to the memories 860, 870 and 880. Also the write signals 890, 900 and 910 are given to the write-enable terminals of the memories 860, 870 and 880, so that the MPU data generated when the write signals are made valid is written in the addresses. The method of setting data into the memories 860, 870 and 880 is as follows. When, for example, color having the level of blue being not higher than the level 200 relative to the level 256 and the levels of green and red being not higher than the level relative to the level 256 is used as a background, data setting into the memories 860, 870 and 880 is perfected by writing "0" as a data in the addresses 0 to 199 of the blue memory 860 in advance, writing "1" as a data in the addresses 200 to 255 thereof, writing "0" in the addresses 0 to 49 in each of the green and red memories 870 and 880 and writing "1" in the addresses 50 to 255 thereof. In practice, the background data can be easily set or updated by a method comprising the steps of reading a mean pixel data in a background color area specified by a coordinate input device, writing "1" in a corresponding address area with a width separately specified by each color component with reference to the value of the data, and clearing the other area to be "0" in advance.

According to this embodiment, the range of background color can be specified by each color component by one level. Further, the circuit arrangement can be simplified by use of memories.

Although above description is applied to the data comparator 173, it is a matter of course that the same circuit may be applied to the display synthesizing portion 130 and that the comparison circuit 600, the transparent color register 680, the valid bit register 700 may be replaced by memories. In this case, it is to be understood that one address decoder can be used commonly and that the setting procedure can be simplified if the memory address of the display synthesizing portion 130 is established to be equal to that of the data comparator 173.

Although the three embodiments have shown the case where the destination memories are all fixed, it is further understood easily by those skilled in the art that circuits can be added to the display memory R/W control portion 170 and other portions to use the display memory 90 as a destination of transfer or for two-way transfer.

According to the present invention, image mask synthesis can be carried out by discriminating foreground image from background image on circuit and by high-speed block transfer using DMAC. Accordingly, the rate of image synthesis shows a value several times as much or several tens of times as much as that in the prior art case where image synthesis is computed by software. Further, according to the invention, high-speed mask memories are not required. Accordingly, the invention has advantages in reduction of circuit scale, cost reduction, improvement in the handling of property due to the omission of the procedure of setting data in the mask memories, and the like.

I claim:

1. An imaging synthesizing apparatus for synthesizing first and second images comprising:
    a first display memory for storing first image data corresponding to the first image;
    a second display memory for storing second image data corresponding to the second image; and
    display memory control means including display reading means, first comparison means, second comparison means, selection means and write control means;
    wherein:
    said display reading means is for periodically reading said first and second image data from said first and second display memories to display said first and second image data;
    said second comparison means is for performing a comparison between said second image data read from said second display memory and predetermined image data at every unit image data;
    said selection means is for selecting either one of said first and second image data read from said first and second display memories in accordance with a result of the comparison performed by said second comparison means;
    said display memory control means is for comparing the second image data corresponding to the second image with said predetermined image data to thereby judge whether or not the second image data is to be written into said first display memory;
    said first comparison means is for performing a comparison between said second image data and said predetermined image data at every unit image data;
    said write control means is for controlling writing of said second image data into said first display memory in accordance with a result of the comparison performed by said first comparison means; and
    said predetermined image data has a specific range, said first comparison means outputs a coincidence signal when said second image data is included within said specific range, and said write control means inhibits writing in said first display memory in response to said coincident signal.

2. An image synthesizing apparatus according to claim 1, wherein said first comparison means comprises a rewritable memory to which said unit image data is applied as an address input and which provides it comparison result as data.

3. An image synthesizing apparatus according to claim 1, wherein said second comparison means comprises a rewritable memory to which said unit image data is applied as an address input and which provides it comparison result as data.

4. An image synthesizing apparatus according to claim 1, wherein:

said second image data is image data corresponding to an image to be superposed on said first image as a foreground image;

color which is excluded from said foreground image is background color; and said predetermined image data is image data of said background color.

5. A digitalized image synthesizing apparatus for synthesizing two image data with respect to a first image corresponding to first image data comprising:

a first display memory for storing the first image data and from which data is periodically read out in synchronism with a raster can;

a second display memory for storing second image data and from which data is periodically read out in synchronism with the raster scan; and image data setting, means first comparison means, display memory writing control means, display reading means, second comparison means, and selection means;

wherein:

said image data setting means is for presetting image data;

said display reading means is for periodically reading the first and second image data from the first and second display memories to display the first and second image data;

said second comparison means is for performing a comparison between the second image data read out from the second display memory and an output of the image data setting means for every unit image data;

said selection means is for selecting one of the first and second image data read out from the first and second display memories in accordance with a result of the comparison performed by the second comparison means to display the selected image data;

said first comparison means is for comparing the second image data with the preset image data for every unit image data when the second image data is read out of the second display memory; and said display memory writing control means is for controlling whether or not the second image data is to be written in the first display memory in accordance with an output of the first comparison means.

6. A digitalized image synthesizing apparatus for synthesizing two image data with respect to a first image corresponding to first image data, comprising:

a first display memory for storing the first image data and from which data is periodically read out in synchronism with a raster can;

a second display memory for storing second image data and from which data is periodically read out in synchronism with the raster scan;

image data setting means for presetting image data;

first comparison means for comparing the second image data with the preset image data for every unit image data when the second image data is read out of the second display memory;

display memory writing control means for controlling whether or not the second image data is to be written in the first display memory in accordance with an output of the first comparison means; and mode setting means for controlling writing into the first display memory of image data to be written into the first display memory by setting a first mode in which the writing control of the writing of the image data to be written into the first display memory depends on contents of the image data to be written into the first display memory and a second mode in which said writing control does not depend on the contents of the image data to be written into the first memory.

7. A digitalized image synthesizing apparatus for synthesizing two image data with respect to a first image corresponding to first image data, comprising:

a first display memory for storing the first image data and from which data is periodically read out in synchronism with a raster can;

a second display memory for storing second image data and from which data is periodically read out in synchronism with the raster scan;

image data setting means for presetting image data;

first comparison means for comparing the second image data with the preset image data for every unit image data when the second image data is read out of the second display memory;

display memory writing control means for controlling whether or not the second image data is to be written in the first display memory in accordance with an output of the first comparison means; and mode for controlling transfer of the second image data stored in said second display memory to said first display memory by setting a transfer mode separate from a normal mode for synthesizing and transferring the second image data stored in said second display memory to said first display memory during creation and editing of digital image data utilized within said apparatus.

8. A digitalized image synthesizing apparatus for synthesizing two image data with respect to a first image corresponding to first image data comprising:

a first display memory for storing the first image data and from which data is periodically read out in synchronism with a raster can;

a second display memory for storing second image data and from which data is periodically read out in synchronism with the raster scan; and image data setting, means first comparison means, display memory writing control means, display reading means, second comparison means, and selection means;

wherein:

said image data setting means is for presetting image data;

said display reading means is for periodically reading the first and second image data from the first and second display memories to display the first and second image data;

said second comparison means is for performing a comparison between the second image data read out from the second display memory and an output of the image data setting means for every unit image data;

said selection means is for selecting one of the first and second image data read out from the first and second display memories in accordance with a result of the comparison performed by the second comparison means to display the selected image data;

said first comparison means is for comparing the second image data with the preset image data for every unit image data when the second image data is read out of the second display memory;

said display memory writing control means is for controlling whether or not the second image data is to be written in the first display memory in accordance with an output of the first comparison means; and said image data setting means includes means for setting an image data range, said first comparison means outputs a coincidence signal when the second image data is within said second image data range, and said display memory writing control means inhibits writing of image data into the first display memory in response to said coincidence signal.

* * * * *